US008964844B2

(12) United States Patent
Lai et al.

(10) Patent No.: US 8,964,844 B2
(45) Date of Patent: Feb. 24, 2015

(54) METHODS AND APPARATUS FOR MOTION SKIP MODE IN MULTI-VIEW CODED VIDEO USING REGIONAL DISPARITY VECTORS

(75) Inventors: PoLin Lai, Los Angeles, CA (US); Peng Yin, West Windsor, NJ (US); Purvin Bibhas Pandit, Frankilin Park, NJ (US)

(73) Assignee: Thomson Licensing, Issy de Moulineaux (FR)

( * ) Notice: Subject to any disclaimer, the term of this patent is extended or adjusted under 35 U.S.C. 154(b) by 1134 days.

(21) Appl. No.: 12/733,192

(22) PCT Filed: Jul. 30, 2008

(86) PCT No.: PCT/US2008/009175
§ 371 (c)(1),
(2), (4) Date: Feb. 12, 2010

(87) PCT Pub. No.: WO2009/023091
PCT Pub. Date: Feb. 19, 2009

(65) Prior Publication Data
US 2010/0158129 A1    Jun. 24, 2010

Related U.S. Application Data
(60) Provisional application No. 60/955,911, filed on Aug. 15, 2007.

(51) Int. Cl.
*H04N 7/12* (2006.01)
*H04N 19/17* (2014.01)
(Continued)

(52) U.S. Cl.
CPC ............. *H04N 19/17* (2014.11); *H04N 19/597* (2014.11); *H04N 19/176* (2014.11); *H04N 19/70* (2014.11);
(Continued)

(58) Field of Classification Search
CPC ........................................................ H04N 7/50
USPC .................................................... 375/240.16
See application file for complete search history.

(56) References Cited

U.S. PATENT DOCUMENTS 6,072,831 A   6/2000  Chen
8,228,994 B2 * 7/2012  Wu et al. .................. 375/240.19
(Continued)

FOREIGN PATENT DOCUMENTS

WO   WO2006064710   6/2006
WO   WO2007148906   12/2007

OTHER PUBLICATIONS

Yang et al., "Regional Disparity Est/Comp for MVC", Joint Video Team (JVT) of ISO/IEC MPEG & ITU-T VCEG, Document: JVT-U047, 21st Meeting: Hangzhou, China, Oct. 20-27, 2006.
Grammalidis et al., Using the expectation-maximization algorithm for depth estimation and segmentation of multi-view images, Proceedings of the 1st Int'l. Symposium on 3D Processing Visualization and Transmission, Jun. 19, 2002, pp. 1-4.

(Continued)

*Primary Examiner* — Sath V Perungavoor
*Assistant Examiner* — James Pontius
(74) *Attorney, Agent, or Firm* — Vincent E. Duffy; Gregory S. Weaver

(57) ABSTRACT

Methods and apparatuses for motion skip mode in multi-view coded video using regional disparity vectors are provided. An image block of a picture corresponding to a view of multi-view video content is encoded by obtaining motion information for the image block based upon disparity information for a first region of plural regions of another picture. The other picture corresponds to another view of the multi-view video content, and each region corresponds to less than an entirety of the other picture. Each region includes multiple image blocks, with each region having been determined based on a similarity among disparity vectors of the multiple image blocks. The disparity information for the first region includes a regional disparity vector determined from the disparity vectors of the multiple image blocks of the first region.

39 Claims, 5 Drawing Sheets

(51) Int. Cl.
*H04N 19/597* (2014.01)
*H04N 19/176* (2014.01)
*H04N 19/70* (2014.01)
*H04N 19/147* (2014.01)
*H04N 19/46* (2014.01)
*H04N 19/513* (2014.01)
*H04N 19/196* (2014.01)
*H04N 19/61* (2014.01)
*H04N 19/103* (2014.01)

(52) U.S. Cl.
CPC ............. *H04N 19/147* (2014.11); *H04N 19/46* (2014.11); *H04N 19/513* (2014.11); *H04N 19/196* (2014.11); *H04N 19/61* (2014.11); *H04N 19/103* (2014.11)
USPC .................................................... 375/240.16

(56) References Cited

U.S. PATENT DOCUMENTS

| | | | | |
|---|---|---|---|---|
| 2005/0105610 | A1* | 5/2005 | Sung | 375/240.01 |
| 2005/0231588 | A1 | 10/2005 | Yang et al. | |
| 2006/0262856 | A1* | 11/2006 | Wu et al. | 375/240.19 |
| 2006/0268987 | A1 | 11/2006 | Ha | |
| 2007/0064799 | A1* | 3/2007 | Ha | 375/240.12 |
| 2007/0064800 | A1* | 3/2007 | Ha | 375/240.12 |
| 2007/0109409 | A1 | 5/2007 | Yea et al. | |
| 2007/0291850 | A1* | 12/2007 | Ishikawa et al. | 375/240.24 |
| 2009/0016436 | A1* | 1/2009 | Park et al. | 375/240.13 |

OTHER PUBLICATIONS

Koo et al.: "CE11: MVC Motion Skip Mode," Video Standards and Drafts, Doc. JVT-V069, Jan. 10, 2007, pp. 1-12.

Malassiotis et al.: "Object-based coding of stereo image sequences using three-dimensional models," IEEE Transactions on Circuits and Systems for Video Technology, vol. 7, No. 6, Dec. 1997, pp. 892-905.

Tzovaras et al., "Object-based coding of stereo image sequences using joint 3-D motion/disparity compensation," IEEE Transactions on Cicruits and Systems for Video Technology, IEEE Service Center, Piscataway, NJ, vol. 7, No. 2, Apr. 1, 1997, pp. 312-327.

Schwarz et al.: "Further results for RD-optimized multi-loop SVC Encoder," Joint Video Team (JVT) of ISO/IEC & ITU-T VCEG, doc. JVT-WO71, Apr. 21, 2007, pp. 1-4.

Vetro et al.: "Joint draft 3.0 on Multiview Video Coding," Joint Video Team (JVT) of ISO/IEC & ITU-T VCEG, doc. JVT-W209, Apr. 21, 2007, pp. 1-39.

Koo et al.: "MVC motion skip mode," Video Standards and Drafts, Joint Video Team (JVT) of ISO/IEC MPEG & ITU-T VCEG, doc. JVT-WO81, Apr. 19, 2007, pp. 1-13.

International Search Report, dated Feb. 4, 2009.

Yang et al., "Regional Disparity Based Motion and Disparity Prediction for MVC", JVT of ISO/IEC MPEG & ITU-T VCEG, Document: JVT-V071, 22nd Meeting: Marrakech, Morocco, Jan. 13-19, 2007.

Shim et al., "High Level Syntax for Flexibile i-frame Position", JVT of ISO/IEC MPEG & ITU-T VCEG, Document: JVT-U046, 21st meeting: Hangzhou, China Oct. 20-27, 2006.

* cited by examiner

CURRENT MB

METHODS AND APPARATUS FOR MOTION SKIP MODE IN MULTI-VIEW CODED VIDEO USING REGIONAL DISPARITY VECTORS

CROSS-REFERENCE TO RELATED APPLICATIONS

This application claims the benefit under 35 U.S.C. §365 of International Application PCT/US2008/009175; filed on Jul. 30, 2008, which was published in accordance with PCT Article 21(2) on Feb. 19, 2009, in English and which claims the benefit of U.S. Provisional Patent Application No. 60/955, 911, filed on Aug. 15, 2007, the contents of which are hereby incorporated by reference in their entirety.

TECHNICAL FIELD

The present principles relate generally to video encoding and decoding and, more particularly, to methods and apparatus for motion skip mode in multi-view coded video using regional disparity vectors.

BACKGROUND

Motion skip mode has recently been adopted as a coding tool for the multi-view video coding (MVC) extension of the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard"). Motion skip mode uses a single global motion vector for each picture to find the corresponding macroblock in the neighboring view and infers motion information. The problem with this approach is that a scene has different disparities for different regions. For example, a foreground object will have a larger disparity as compared to the far background. Approximating the frame-wise disparity with a single global disparity is not accurate.

The prior art use of motion skip mode is largely decomposed into two stages. The first stage involves searching for the corresponding macroblock and the second stage involves deriving the motion information. In the first stage, a "global disparity vector" is used to indicate the corresponding position in the picture of a neighboring view. In the second stage, motion information is derived from the corresponding macroblock in the picture of neighboring view, and the motion information is copied and applied to the current macroblock.

The prior art approach to motion skip mode locates the corresponding macroblock in the neighboring view by means of a global disparity vector (GDV). The global disparity vector is measured by the macroblock-size of units between the current picture and the picture of the neighboring view. The global disparity vector can be estimated and decoded periodically, for example, at every anchor picture. In such a case, the global disparity vector of a non-anchor picture is interpolated using the recent global disparity vectors from the anchor pictures. The global disparity vector is obtained as a single vector for the whole picture.

Turning to FIG. 1, a derivation of global disparity in accordance with the prior art is indicated generally by the reference numeral 100. The derivation 100 is shown with respect to a spatial axis 110 and a temporal axis 120.

The $GDV_{cur}$ between the current view and one of the neighboring views on a certain picture order count (POC) is derived using the following formula:

$$GDV_{cur} = GDV_{ahead} + \left\lfloor \frac{POC_{cur} - POC_{ahead}}{POC_{behind} - POC_{ahead}} \times (GDV_{behind} - GDV_{ahead}) \right\rfloor.$$

$GDV_{ahead}$ and $GDV_{behind}$ are two recently decoded global disparity vectors. $POC_{cur}$, $POC_{ahead}$, and $POC_{behind}$ are picture order counts numbered along the temporal axis 120. The current frame can possibly have as many $GDV_{cur}$ as the number of inter-view prediction references defined in the sequence parameter set (SPS) of the multi-view video coding (MVC) extension syntax of the Joint Multi-view Video Model (JMVM).

To decode the global disparity, a syntax element global_disparity_mb_IX was proposed for use at the slice level. The syntax element includes measured global disparity vector components, where the global disparity of non-anchor pictures is derived using the above equation.

TABLE 1 specifies slice header syntax for motion skip mode for use with the multi-view video coding extension of the MPEG-4 AVC Standard.

TABLE 1

| slice_header_mvc_extension ( ) { | C | Descriptor |
|---|---|---|
|   first_mb_in_slice | 2 | ue(v) |
|   slice_type | 2 | ue(v) |
|   if ( view_level != 0 && anchor_pic_flag ) { | | |
|     if( slice_type = = P \| \| slice_type = = B ) { | | |
|       for( compldx = 0; compldx < 2; compldx++ ) | | |
|         global_disparity_mb_l0[ compldx ] | 2 | se(v) |
|     } | | |
|     if(( slice_type = = B ) { | | |
|       for( compldx = 0; compldx < 2; compldx++ ) | | |
|         global_disparity_mb_l1[ compldx ] | 2 | se(v) |
|     } | | |
|   } | | |
|   pic_parameter_set_id | 2 | ue(v) |
|     --- The remaining parts are identical to JMVM --- | | |

Some of the syntax elements in TABLE 1 are defined as follows:

global_disparity_mb_l0[compldx] specifies the global disparity in macroblock-size units between the current slice and the slice of an inter-view prediction reference for list0. The horizontal offset is decoded first in decoding order and is assigned Compldx=0. The vertical offset is decoded second in decoding order and is assigned Compldx=1.

global_disparity_mb_l1[compldx] has the same semantics as global_disparity_mb_l0, with l0 and list0 replaced by l1 and list1, respectively.

TABLE 2 specifies macroblock layer syntax for motion skip mode.

TABLE 2

| macroblock_layer_mvc_extension ( ) { | C | Descriptor |
|---|---|---|
|   if (! anchor_pic_flag ) { | | |
|     motion_skip_flag | 2 | u(1) \| ae(v) |
|   } | | |
|   if (! motion_skip_flag) { | | |
|     mb_type | 2 | ue(v) \| ae(v) |
|     if( mb_type = = I_PCM ) { | | |
|       while( !byte_aligned( ) ) | | |
|         pcm_alignment_zero_bit | 2 | f(1) |

TABLE 2-continued

| macroblock_layer_mvc_extension ( ) { | C | Descriptor |
|---|---|---|
|     for( i = 0; i < 256; i++ ) | | |
|         pcm_sample_luma[ i ] | 2 | u(v) |
|     for( i = 0; i < 2 * MbWidthC * MbHeightC; i++ ) | | |
|         pcm_sample_chroma[ i ] | 2 | u(v) |
| } else { | | |
|     ...... | 2 | |
|   } | | |
|   } | | |
| } | | |
| --- The remaining parts are identical to JMVM --- | | |

Some of the syntax elements in TABLE 2 are defined as follows:

motion_skip_flag equal to 1 indicates that the coded macroblock is in motion skip mode. motion_skip_flag equal to 0 indicates that the coded macroblock is not in motion skip mode.

The main drawback of this prior art approach is that the disparity within a scene varies a lot among different regions of the scene. For example, a foreground object will have a larger disparity as compared to the far background. Thus, covering the whole picture with a single "global disparity vector" is not precise. This could results in finding macroblocks from the neighboring view that do not really correspond to the current macroblock under consideration.

SUMMARY

These and other drawbacks and disadvantages of the prior art are addressed by the present principles, which are directed to methods and apparatus for motion skip mode in multi-view coded video using regional disparity vectors.

According to an aspect of the present principles, there is provided an apparatus. The apparatus includes an encoder for encoding an image block of a picture corresponding to at least one view of multi-view video content by obtaining motion information for the image block based upon disparity information for a region of another picture corresponding to at least one other view of the multi-view video content. The disparity information for the region of the other picture corresponds to less than an entirety of the other picture.

According to another aspect of the present principles, there is provided a method. The method includes encoding an image block of a picture corresponding to at least one view of multi-view video content by obtaining motion information for the image block based upon disparity information for a region of another picture corresponding to at least one other view of the multi-view video content. The disparity information for the region of the other picture corresponds to less than an entirety of the other picture.

According to yet another aspect of the present principles, there is provided an apparatus. The apparatus includes a decoder for decoding an image block of a picture corresponding to at least one view of multi-view video content by obtaining motion information for the image block based upon disparity information for a region of another picture corresponding to at least one other view of the multi-view video content. The disparity information for the region of the other picture corresponds to less than an entirety of the other picture.

According to still another aspect of the present principles, there is provided a method. The method includes decoding an image block of a picture corresponding to at least one view of multi-view video content by obtaining motion information for the image block based upon disparity information for a region of another picture corresponding to at least one other view of the multi-view video content. The disparity information for the region of the other picture corresponds to less than an entirety of the other picture.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
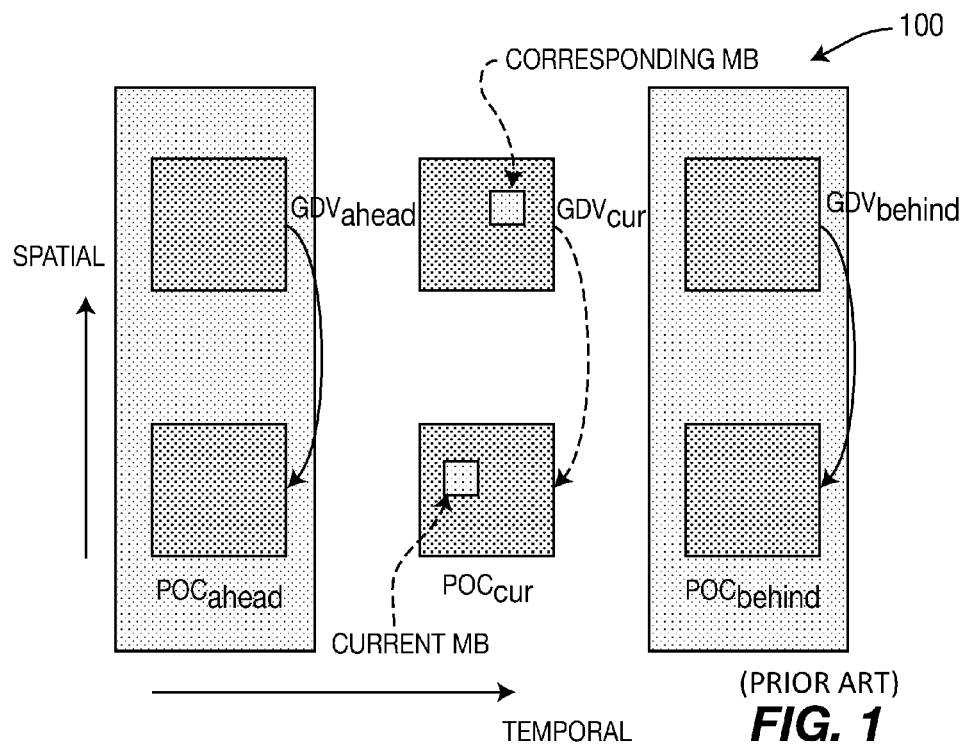
FIG. 1 is a diagram for a derivation of global disparity in accordance with the prior art.

The present principles are directed to methods and apparatus for motion skip mode in multi-view coded video using regional disparity vectors.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

As used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, Picture Parameter Set (PPS) level, Sequence Parameter Set (SPS) level, View Parameter Set (VPS) level, and Network Abstraction Layer (NAL) unit header level.

Moreover, as interchangeably used herein, "cross-view" and "inter-view" both refer to pictures that belong to a view other than a current view.

Further, as used herein, "plurality" refers to two or more of an item. Thus, for example, a "plurality of regional disparity vectors" refers to two or more regional disparity vectors.

Also, as used herein, the phrase "motion information" refers to temporal changes corresponding to the same view.

Additionally, as used herein, the phrase "disparity information" refers to spatial changes across different views.

Moreover, as used herein, "existing syntax" refers to syntax that exists in any existing video coding standard, recommendation, and extension thereof relating to multi-view content, including, but not limited to the MPEG-4 AVC Standard, as compared to new syntax generated for the purposes of the present principles. Accordingly, such existing syntax may serve at least a dual purpose, the first being the intended purpose of the existing video coding standards and recommendations to which it pertains as well as at least one purpose in accordance with the present principles.

It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, it is to be appreciated that while one or more embodiments of the present principles are described herein with respect to the multi-view video coding (MVC) extension of the MPEG-4 AVC standard, the present principles are not limited to solely this standard and, thus, may be utilized with respect to other video coding standards, recommendations, and extensions thereof relating to multi-view video coding, including extensions of the MPEG-4 AVC standard, while maintaining the spirit of the present principles.

Figure 2:
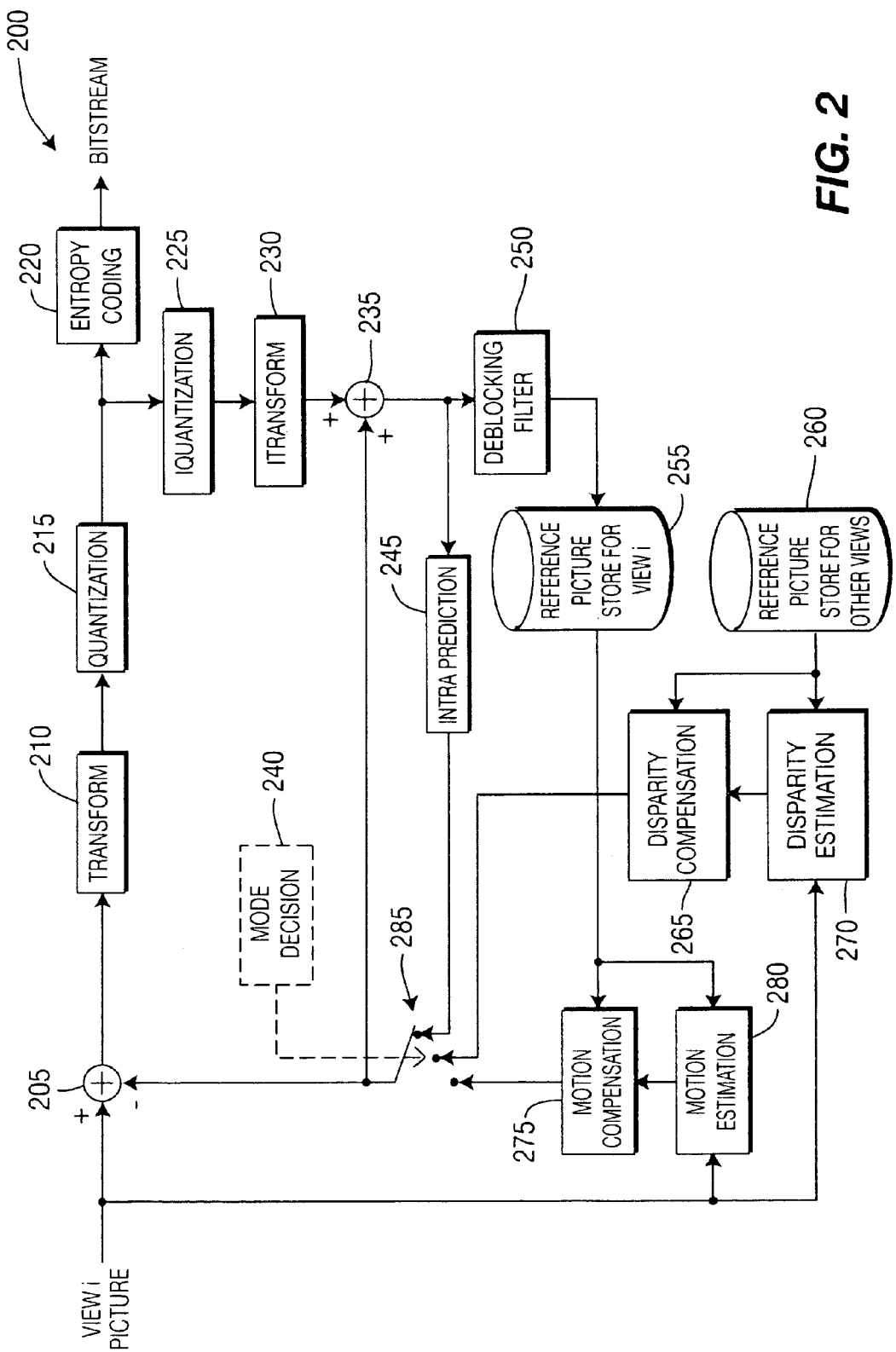
FIG. 2 is a block diagram for an exemplary Multi-view Video Coding (MVC) encoder to which the present principles may be applied, in accordance with an embodiment of the present principles.

Turning to FIG. 2, an exemplary Multi-view Video Coding (MVC) encoder is indicated generally by the reference numeral 200. The encoder 200 includes a combiner 205 having an output connected in signal communication with an input of a transformer 210. An output of the transformer 210 is connected in signal communication with an input of quantizer 215. An output of the quantizer 215 is connected in signal communication with an input of an entropy coder 220 and an input of an inverse quantizer 225. An output of the inverse quantizer 225 is connected in signal communication with an input of an inverse transformer 230. An output of the inverse transformer 230 is connected in signal communication with a first non-inverting input of a combiner 235. An output of the combiner 235 is connected in signal communication with an input of an intra predictor 245 and an input of a deblocking filter 250. An output of the deblocking filter 250 is connected in signal communication with an input of a reference picture store 255 (for view i). An output of the reference picture store 255 is connected in signal communication with a first input of a motion compensator 275 and a first input of a motion estimator 280.

An output of the motion estimator 280 is connected in signal communication with a second input of the motion compensator 275

An output of a reference picture store 260 (for other views) is connected in signal communication with a first input of a disparity/illumination estimator 270 and a first input of a disparity/illumination compensator 265. An output of the disparity/illumination estimator 270 is connected in signal communication with a second input of the disparity/illumination compensator 265.

An output of the entropy decoder 220 is available as an output of the encoder 200. A non-inverting input of the combiner 205 is available as an input of the encoder 200, and is connected in signal communication with a second input of the disparity/illumination estimator 270, and a second input of the motion estimator 280. An output of a switch 285 is connected in signal communication with a second non-inverting input of the combiner 235 and with an inverting input of the combiner 205. The switch 285 includes a first input connected in signal communication with an output of the motion compensator 275, a second input connected in signal communication with an output of the disparity/illumination compensator 265, and a third input connected in signal communication with an output of the intra predictor 245.

A mode decision module 240 has an output connected to the switch 285 for controlling which input is selected by the switch 285.

Figure 3:
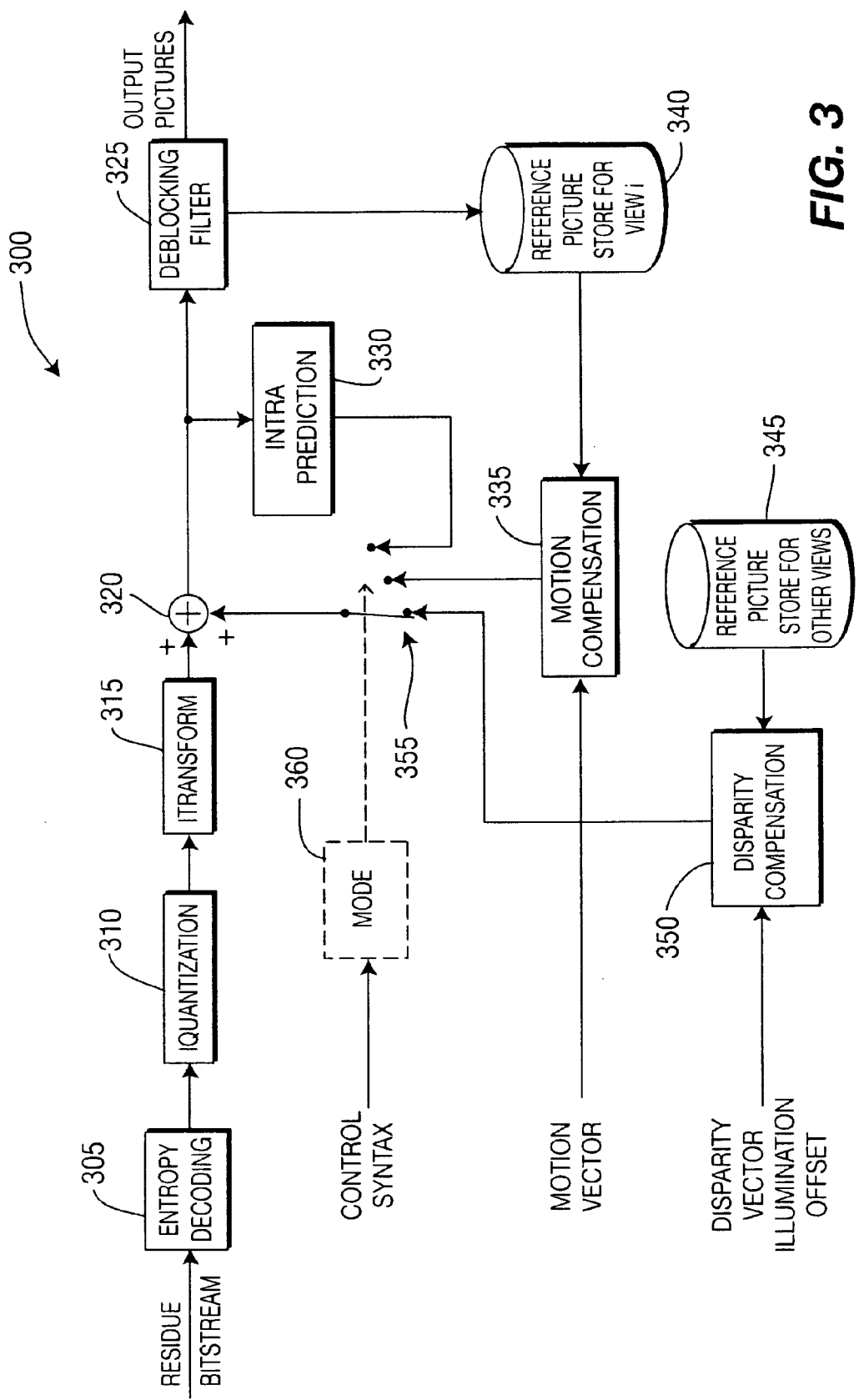
FIG. 3 is a block diagram for an exemplary Multi-view Video Coding (MVC) decoder to which the present principles may be applied, in accordance with an embodiment of the present principles.

Turning to FIG. 3, an exemplary Multi-view Video Coding (MVC) decoder is indicated generally by the reference numeral 300. The decoder 300 includes an entropy decoder 305 having an output connected in signal communication with an input of an inverse quantizer 310. An output of the inverse quantizer is connected in signal communication with an input of an inverse transformer 315. An output of the inverse transformer 315 is connected in signal communication with a first non-inverting input of a combiner 320. An output of the combiner 320 is connected in signal communication with an input of a deblocking filter 325 and an input of an intra predictor 330. An output of the deblocking filter 325 is connected in signal communication with an input of a reference picture store 340 (for view i). An output of the reference picture store 340 is connected in signal communication with a first input of a motion compensator 335.

An output of a reference picture store 345 (for other views) is connected in signal communication with a first input of a disparity/illumination compensator 350.

An input of the entropy coder 305 is available as an input to the decoder 300, for receiving a residue bitstream. Moreover, an input of a mode module 360 is also available as an input to the decoder 300, for receiving control syntax to control which input is selected by the switch 355. Further, a second input of the motion compensator 335 is available as an input of the decoder 300, for receiving motion vectors. Also, a second input of the disparity/illumination compensator 350 is available as an input to the decoder 300, for receiving disparity vectors and illumination compensation syntax.

An output of a switch 355 is connected in signal communication with a second non-inverting input of the combiner 320. A first input of the switch 355 is connected in signal communication with an output of the disparity/illumination compensator 350. A second input of the switch 355 is connected in signal communication with an output of the motion compensator 335. A third input of the switch 355 is connected in signal communication with an output of the intra predictor 330. An output of the mode module 260 is connected in signal communication with the switch 355 for controlling which input is selected by the switch 355. An output of the deblocking filter 325 is available as an output of the decoder.

As noted above, the present principles are directed to methods and apparatus for motion skip mode in multi-view coded video using regional disparity vectors. Multi-view video coding (MVC) is the compression framework for the encoding of multi-view sequences. A Multi-view Video Coding (MVC) sequence is a set of two or more video sequences that capture the same scene from a different view point.

As noted above with respect to the prior art, currently in motion skip mode in accordance with the Joint Multi-view Video Model (JMVM), the motion information of a particular view is inferred from a corresponding macroblock in the frame from the neighboring view. Moreover, as noted above with respect to the prior art, a "global disparity vector", which applies to the entire picture, is calculated to find the corresponding macroblock in the neighboring view. This global disparity vector is then transmitted in each anchor picture and used by the non-anchor pictures to obtain a corresponding macroblock.

In contrast, we propose the use of "regional disparity vectors" for a single picture. A picture is first partitioned into regions with different disparities. For each region, a regional disparity vector is calculated. After obtaining N regional vectors which may be pixel, 4×4 block, 8×8 block or macroblock aligned, we signal this for each anchor picture. The non-anchor pictures then select on a macroblock-basis which disparity vector to use in order to infer motion information.

In an embodiment, in order to get relatively accurate information for the disparity for each macroblock, we partition the picture into regions with different disparities. Each region corresponds to a particular class and includes blocks with similar disparity values. Each class can then be approximated by a single disparity vector. Thus, we obtain several regional disparity vectors.

In one or more embodiments, the regional disparity vectors can be transmitted only for anchor pictures, and the non-anchor pictures can either use these vectors from the anchor pictures directly or can scale these vectors based on their respective relative distance from the anchor picture. Although this is optional, the advantage of this approach is that we can save the bits we transmit for disparity vectors by transmitting just at the anchor pictures.

In another embodiment, we transmit the disparity vectors for each non-anchor picture. The disadvantage of this approach is that we need many bits to transmit the regional disparity vectors. However, the advantage is that the vectors may be more accurate and can help select a corresponding macroblock with a greater accuracy.

We partition the current picture into regions with roughly similar disparity within each region, and then represent each region with a single disparity vector. With disparity information, there exist various ways to achieve this goal. Unlike most of the literature in computer vision, where elaborate methods are developed to find an accurate and smooth disparity map at the pixel-level, in contrast, in accordance with an embodiment of the present principles, we demonstrate a clustering method based on the horizontal-component of the block-wise disparity vectors obtained from the initial disparity compensation performed by the video encoder. This approach is suitable for multi-view systems with cameras arranged on the same horizontal line. For two-dimensional (2D) camera arrangements such as a camera array, the clustering could be extended to both x and y directions of the disparity vectors.

To achieve block segmentation using disparity vectors, we propose a clustering approach using Gaussian Mixture Model (GMM). Expectation-Maximization algorithm (EM algorithm) is applied to achieve GMM clustering. This method will model the histogram of the horizontal-component of disparity vectors with multiple Gaussian distributions. Blocks are classified into different regions based on the likelihood of their disparity vectors calculated for each Gaussian component.

Figure 4:
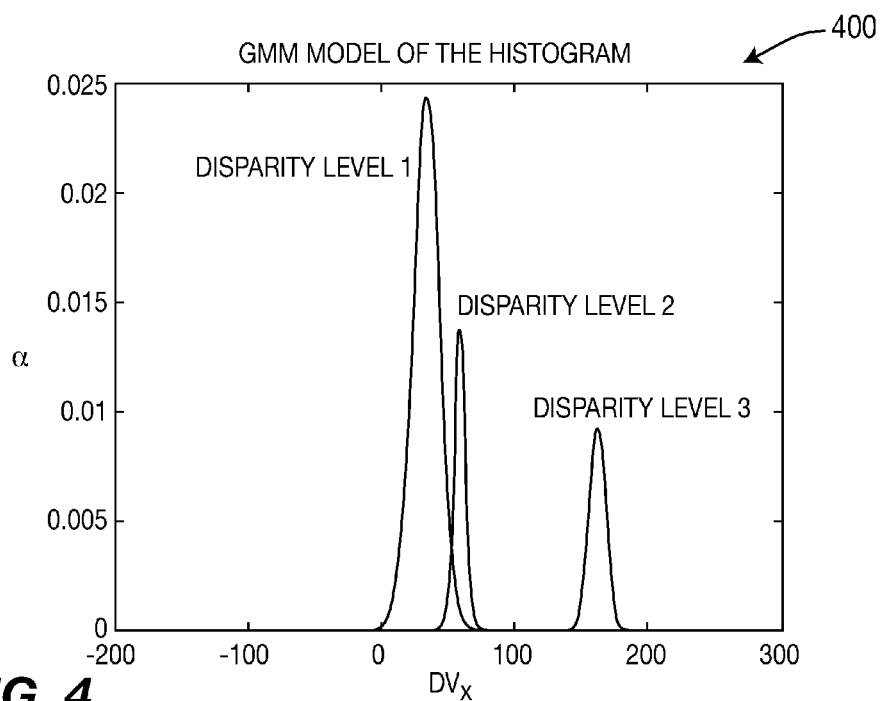
FIG. 4 is an exemplary histogram after Gaussian Mixture Model (GMM) classification of regional disparity vectors, in accordance with an embodiment of the present principles.

After this classification, we obtain for each disparity class (region) a mean disparity vector. Turning to FIG. 4, an exemplary histogram after Gaussian Mixture Model (GMM) classification of regional disparity vectors is indicated generally by the reference numeral 400. The histogram 400 represents the output of the classification tool according to an embodiment of the present principles.

After we obtain the N mean disparity vectors for the N regions, they are rounded to the nearest integer which can correspond to a pixel, 4×4 block, 8×8 block or macroblock boundary. In an embodiment, the N mean disparity vectors are then signaled as high level syntax. As noted above, the high level syntax can be, for example, but is not limited to syntax at the slice header level, Supplemental Enhancement Information (SEI) level, Picture Parameter Set (PPS) level, Sequence Parameter Set (SPS) level and Network Abstraction Layer (NAL) unit header level. Depending on the embodiment, these regional disparity vectors may be signaled only for anchor picture or may be signaled for anchor and non-anchor pictures. In one embodiment, this information is signaled for all the pictures in the slice header. TABLE 3 illustrates a proposed slice header for motion skip mode, in accordance with an embodiment of the present principles.

In the description that follows the regional disparity vectors are presumed to be aligned at macroblock boundaries but they can potentially be aligned at pixel, 2×2 block, 4×4 block, or even 8×8 block boundaries.

The semantics for the proposed syntax element in accordance with an embodiment of the present principles are described herein below.

The slice header semantics include the following:
num_regional_disparity_vectors_l0 indicates the number of regional disparity vectors for the current slice that correspond to the LIST_0 inter-view reference picture.
num_regional_disparity_vectors_l1 indicates the number of regional disparity vectors for the current slice that correspond to the LIST_1 inter-view reference picture.
regional_disparity_l0[ numVect][compIdx] specifies a disparity vector component to be used. The index numVect specifies to which region regional_disparity_l0 belongs. The horizontal disparity vector component is decoded first in decoding order and is assigned compIdx=0. The vertical disparity vector component is decoded second in decoding order and is assigned compIdx=1.
regional_disparity_l1[ numVect][compIdx] has the same semantics as regional_disparity_l0, with l0 by l1.

The macroblock layer semantics include the following:
list_idx when present indicates which list is used to infer the motion and mode information. list_idx equal to 0 indicates that the macroblock will infer the motion and mode information from the LIST_0 inter-view reference picture. list_idx equal to 1 indicates that the macroblock will infer the motion and mode information from the LIST_1 inter-view reference picture.
regional_disparity_idx, when present, specifies the index in the regional_disparity__1x array that is to be used for selection of the regional disparity vector to obtain the corresponding motion vector. The selection between regional_disparity_l0 and regional_disparity_l1 depends on the syntax list_idx.

TABLE 3

| slice_header_mvc_extension ( ) { | C | Descriptor |
|---|---|---|
|     first_mb_in_slice | 2 | ue(v) |
|     slice_type | 2 | ue(v) |
|     if( slice_type = = P \|\| slice_type = = B ) { | | |
|         num_regional_disparity_vectors_l0 | 2 | ue(v) |
|         for( numVect = 0; numVect < num_disparity_vectors_l0-1; numVect++ ) | | |
|             for( compIdx = 0; compIdx < 2; compIdx++ ) | | |
|                 regional_disparity_l0[numVect][ compIdx ] | 2 | se(v) |
|     if(( slice_type = = B ) { | | |
|         num_regional_disparity_vectors_l1 | 2 | ue(v) |
|         for( numVect = 0: numVect < num_disparity_vectors_l1-1; numVect++ ) | | |
|             for( compIdx = 0; compIdx < 2; compIdx++ ) | | |
|                 regional_disparity_l1[numVect][ compIdx ] | 2 | se(v) |
|         } | | |
|     } | | |
|     pic_parameter_set_id | 2 | ue(v) |
| --- The remaining parts are identical to JMVM --- | | |

Once these regional disparity vectors have been obtained, each macroblock can then use one of these regional disparity vectors to obtain a corresponding macroblock from another view for the motion skip mode. Once it is determined which regional disparity vector gives the least cost in terms of rate-distortion, the determined regional disparity vector is signaled so that the decoder can use the same disparity vector. Thus, at a macroblock level, we signal which disparity vectors is used when the macroblock mode is motion skip. TABLE 4 illustrates a proposed macroblock layer for motion skip mode, in accordance with an embodiment of the present principles.

In another embodiment, the regional disparity vectors are not transmitted by the encoder but instead can be calculated on the encoder and/or decoder side using existing syntax and available data.

It is also possible to use multiple inter-view references for anchor and/or non-anchor pictures. Thus, in another embodiment, the regional disparity vectors can be specified for each of the inter-view reference pictures. At the macroblock level, we then need to indicate which inter-view reference picture should be used to derive the information. TABLE 5 illustrates a proposed slice header for motion skip mode with multiple references, in accordance with an embodiment of the present principles.

TABLE 5

| slice_header_mvc_extension ( ) { | C | Descriptor |
|---|---|---|
|     first_mb_in_slice | 2 | ue(v) |
|     slice_type | 2 | ue(v) |
|     if( slice_type == P \|\| slice_type == B ) { | | |
|         num_regional_disparity_vectors_l0 | 2 | ue(v) |
|         for( numRef = 0; numRef < num_non_anchor_refs_l0[i]; numRef++ ) | | |
|             for( numVect = 0; numVect < num_disparity_vectors_l0-1; numVect++ ) | | |
|                 for( compIdx = 0; compIdx < 2; compIdx++ ) | | |
|                       regional_disparity_l0[numRef][numVect][ compIdx ] | 2 | se(v) |
|     if( slice_type == B ) { | | |
|         num_regional_disparity_vectors_l1 | 2 | ue(v) |
|         for( numRef = 0; numRef < num_non_anchor_refs_l1[i]; numRef++ ) | | |
|             for( numVect = 0: numVect < num_disparity_vectors_l1-1; numVect++ ) | | |
|                 For( compIdx = 0; compIdx < 2; compIdx++ ) | | |
|                     regional_disparity_l1[numRef] [numVect][ compIdx ] | 2 | se(v) |
|         } | | |
|     } | | |
|     pic_parameter_set_id | 2 | ue(v) |
| --- The remaining parts are identical to JMVM --- | | |

TABLE 6 illustrates a proposed macroblock layer for motion skip mode with multiple inter-view references, in accordance with an embodiment of the present principles.

The only addition is the loop for the multiple references in TABLE 5. In TABLE 6, an additional ref_dx is added to indicate which of the multiple inter-view reference pictures is

TABLE 6

| macroblock_layer( ) [ | C | Descriptor |
|---|---|---|
| if (!anchor_pic_flag ) | | |
|     motion_skip_flag | 2 | u(1)\|ae(v) |
| if (!motion_skip_flag) | | |
|     mb_type | 2 | ue(v)\|ae(v) |
| if(!motion_skip_flag && mb_type == I_PCM ) { | | |
|     while( !byte_aligned( ) ) | | |
|         pcm_alignment_zero_bit | 2 | f(1) |
|     for( i = 0; i < 256: i++ ) | | |
|         pcm_sample_luma[ i ] | 2 | u(v) |
|     for( i = 0; i < 2 * MbWidthC * MbHeightC; i++) | | |
|         pcm_sample_chroma[ i ] | 2 | u(v) |
| } else { | | |
|     noSubMbPartSizeLessThan8x8Flag = 1 | | |
|     if (!motion_skip_flag) { | | |
|         if( mb_type != I_NxN && | | |
|             MbPartPredMode( mb_type. 0 ) != Intra_16x16 && | | |
|             NumMbPart( mb_type ) == 4 ) { | | |
|             ......... | | |
|         } else { | | |
|             if( transform_8x8_mode_flag && mb_type == I_NxN ) | | |
|                 transform_size_8x8_flag | 2 | u(1)\|ae(v) |
|             mb_pred( mb_type ) | 2 | |
|         } | | |
|     } else { | | |
|         list_idx | 2 | u(1)\|ae(v) |
|         ref_idx | 2 | te(v)\|ae(v) |
|         regional_disparity_idx | 2 | te(v)\|ae(v) |
|     } | | |
|     if( MbPartPredMode( mb_type. 0 ) != Intra_16x16 ) { | | |
|         coded_block_pattern | 2 | me(v)\|ae(v) |
|         if( CodedBlockPatternLuma> 0 && | | |
|             transform_8x8_mode_flag && mb_type != I_NxN && | | |
|             noSubMbPartSizeLessThan8x8Flag && | | |
|             ( mb_type != B_Direct_16x16 \|\| direct_8x8_inference_flag ) ) | | |
|             transform_size_8x8_flag | 2 | u( 1 )\|ae(v) |
|     } | | |
|     if( CodedBlockPatternLuma > 0 \|\| CodedBlockPatternChroma > 0 \|\| | | |
|         MbPartPredMode( mb_type. 0 ) == Intra_16x16 ) { | | |
|         mb_qp_delta | 2 | se( v )\|ae( v ) |
|         residual( ) | 3\|4 | |
|     } | | |
|     } | | |
| } | | | to be used in order to obtain the regional disparity vector for the current macroblock. The semantics of ref_idx is as follows:

ref_idx, when present, specifies the index in reference picture list signalled by list_idx of the inter-view reference picture to be used for obtaining the regional disparity vector [please clarify].

Figure 5:
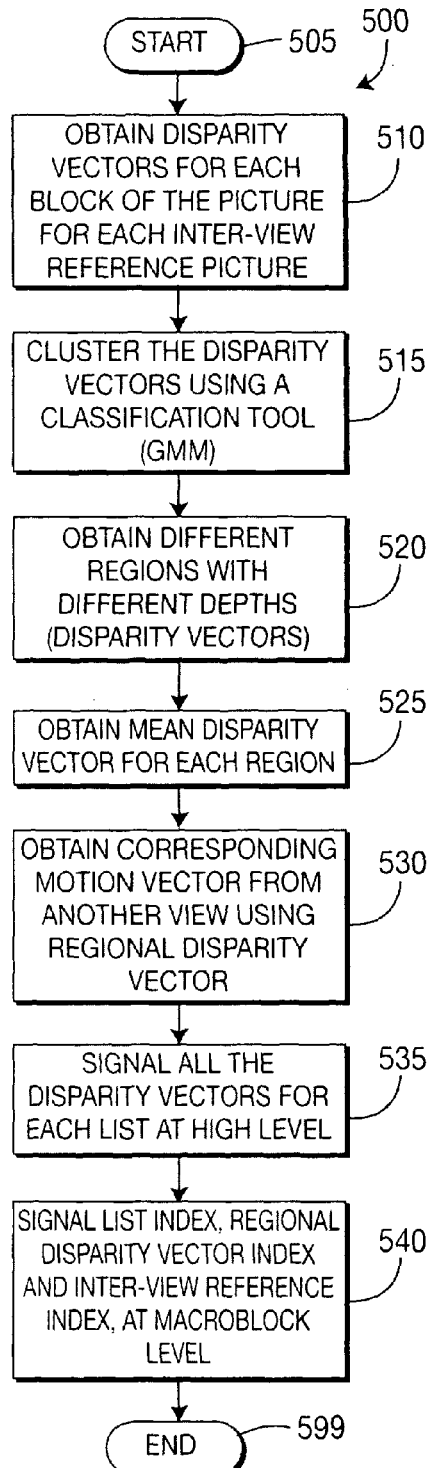
FIG. 5 is a flow diagram for an exemplary method for obtaining and signaling regional disparity vectors for motion skip mode, in accordance with an embodiment of the present principles.

Turning to FIG. 5, an exemplary method for obtaining and signaling regional disparity vectors for motion skip mode is indicated generally by the reference numeral 500.

The method 500 includes a start block 505 that passes control to a function block 510. The function block 510 obtains disparity vectors for each block of the picture for each inter-view reference picture, and passes control to a function block 515. The function block 515 uses a classification tool (for example, including, but not limited to Gaussian Mixture Model (GMM) to cluster the disparity vectors, and passes control to a function block 520. The function block 520 obtains different regions with different depths (disparity vectors), and passes control to a function block 525. The function block 525 obtains the mean disparity vector for each such region, and passes control to a function block 530. The function block 530 uses the respective regional disparity vectors to obtain respective corresponding motion vectors from another view, and passes control to a function bloc 535. The function block 535 signals all the disparity vectors for each list at a high level (for example, using a high level syntax), and passes control to a function block 540. The function block 540 signals at the macroblock level a list index regional disparity vector index and an inter-view reference index, and passes control to an end block 599.

Figure 6:
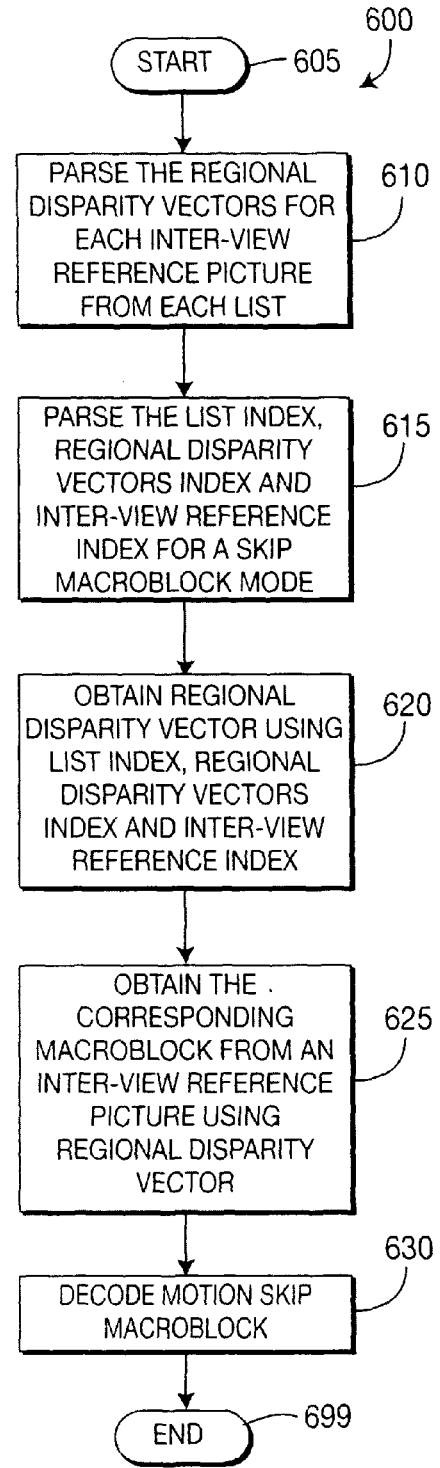
FIG. 6 is a flow diagram for an exemplary method for decoding and using regional disparity vectors, in accordance with an embodiment of the present principles.

Turning to FIG. 6, an exemplary method for decoding and using regional disparity vectors is indicated generally by the reference numeral 600.

The method 600 includes a start block 605 that passes control to a function block 610. The function block 610 parses the regional disparity vectors for each inter-view reference picture from each list, and passes control to a function block 615. The function block 615 parses the list index, regional disparity vectors index, and the inter-view reference index for a skip mode macroblock, and passes control to a function block 620. The function block 620 uses the list index, the regional disparity vectors index, and the inter-view reference index to obtain the regional disparity vector, and passes control to a function block 625. The function block 625 uses the regional disparity vector to obtain the corresponding macroblock from an inter-view reference picture, and passes control to a function block 630. The function block 630 decodes the motion skip macroblock, and passes control to an end block 699.

Figure 7:
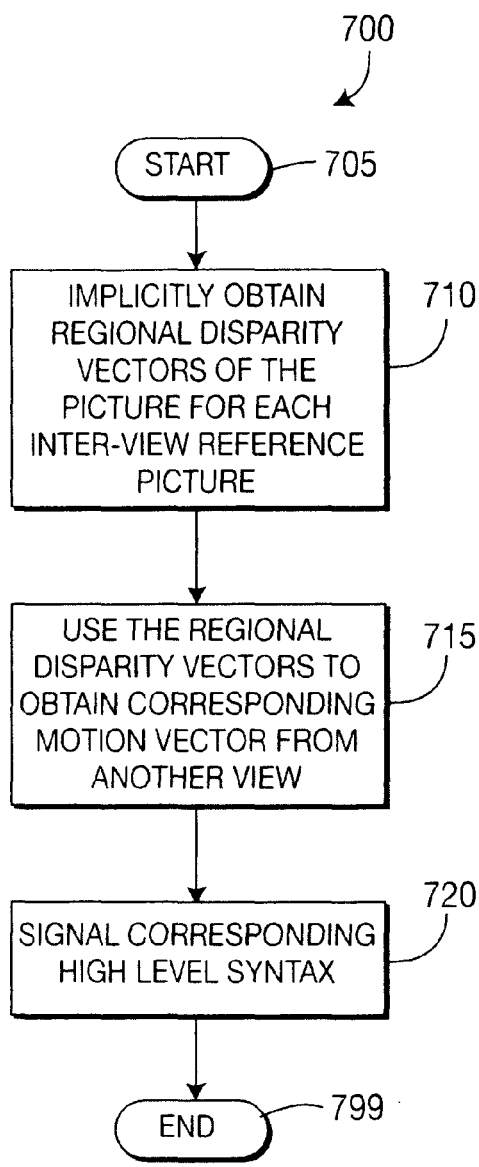
FIG. 7 is a flow diagram for another exemplary method for obtaining and using regional disparity vectors, in accordance with an embodiment of the present principles.

Turning to FIG. 7, another exemplary method for obtaining and using regional disparity vectors is indicated generally by the reference numeral 700.

The method 700 includes a start block 705 that passes control to a function block 710. The function block 710 implicitly obtains regional disparity vectors of a current picture for each inter-view reference picture corresponding thereto, and passes control to a function block 715. The function block 715 uses a given regional disparity vector to obtain a corresponding motion vector from another view, and passes control to a function block 720. The function block 720 signals one or more corresponding high level syntaxes that enable subsequent implicit derivation of the disparity vectors at a decoder side, and passes control to an end block 799.

Figure 8:
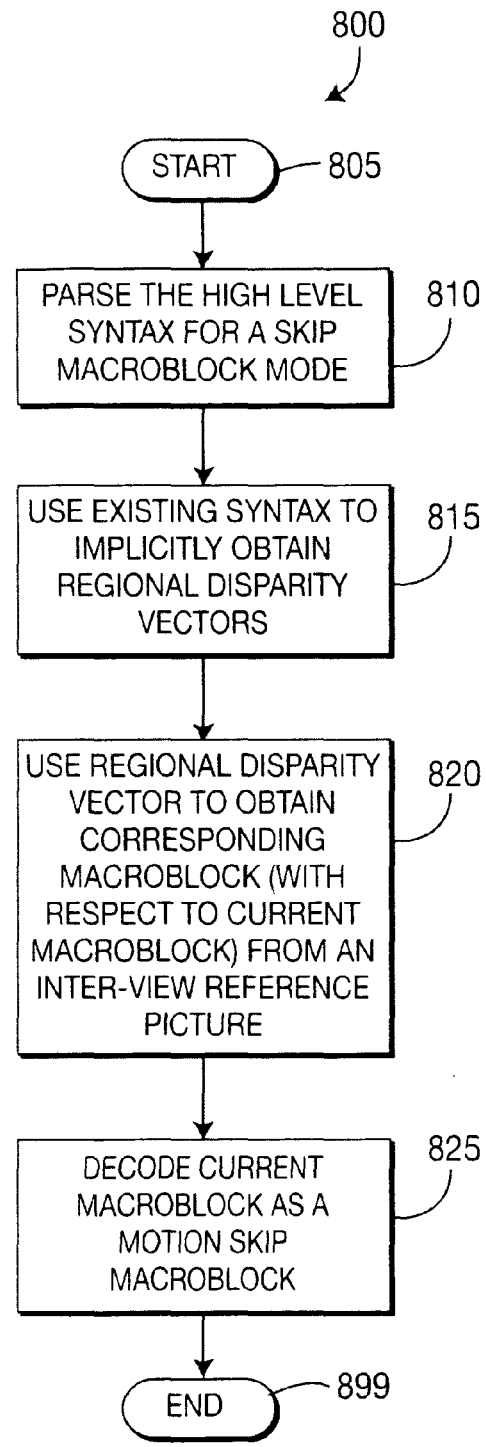
FIG. 8 is a flow diagram for another exemplary method for decoding and using regional disparity vectors, in accordance with an embodiment of the present principles.

Turning to FIG. 8, another exemplary method for decoding and using regional disparity vectors is indicated generally by the reference numeral 800.

The method 800 includes a start block 805 that passes control to a function block 810. The function block 810 parses the high level syntax for a skip macroblock mode, and passes control to a function block 815. The function block 815 uses existing syntax to implicitly obtain regional disparity vectors, and passes control to a function block 820. The function block 820 uses a regional disparity vector to obtain a corresponding macroblock (with respect to a current macroblock being decoded) from an inter-view reference picture, and passes control to a function block 825. The function block 825 decodes the current macroblock as a motion skip macroblock, and passes control to an end block 899.

A description will now be given of some of the many attendant advantages/features of the present invention, some of which have been mentioned above. For example, one advantage/feature is an apparatus that includes an encoder for encoding an image block of a picture corresponding to at least one view of multi-view video content by obtaining motion information for the image block based upon disparity information for a region of another picture corresponding to at least one other view of the multi-view video content. The disparity information for the region of the other picture corresponds to less than an entirety of the other picture.

Another advantage/feature is the apparatus having the encoder as described above, wherein the disparity information for the region of the other picture includes at least one regional disparity vector, and the encoder obtains more than one regional disparity vector for each inter-view reference picture considered when encoding the multi-view video content.

Yet another advantage/feature is the apparatus having the encoder as described above, wherein the encoder obtains a plurality of regional disparity vectors for the other picture, and the disparity information for the region of the other picture includes a regional disparity vector.

Still another advantage/feature is the apparatus having the encoder that obtains a plurality of regional disparity vectors for the other picture, and the disparity information for the region of the other picture includes a regional disparity vector as described above, wherein the encoder obtains the plurality of disparity vectors for each of a plurality of blocks of the other picture, and classifies the plurality of blocks into different regions based on the plurality of disparity vectors.

Moreover, another advantage/feature is the apparatus having the encoder that classifies as described above, wherein the encoder respectively calculates a mean disparity vector for each of the different regions.

Further, another advantage/feature is the apparatus having the encoder that respectively calculates a mean disparity vector for each of the different regions as described above, wherein the mean disparity vector respectively calculated for each of the different regions is respectively used as the regional disparity vector there for.

Also, another advantage/feature is the apparatus having the encoder that respectively calculates a mean disparity vector for each of the different regions as described above, wherein the regional disparity vector respectively calculated for each of the different regions is transmitted using a high level syntax element.

Additionally, another advantage/feature is the apparatus having the encoder that transmits using a high level syntax element as described above, wherein the high level syntax element is included in at least one of a slice header, a sequence parameter set, a picture parameter set, a view parameter set, a network abstraction layer unit header, and a supplemental enhancement information message.

Moreover, another advantage/feature is the apparatus having the encoder as described above, wherein a list index, a regional disparity index, and a reference index are transmitted for each image block corresponding to the multi-view content selected as a motion skip macroblock.

Further, another advantage/feature is the apparatus having the encoder as described above, wherein the encoder implicitly derives a regional disparity vector respectively calculated for each of different regions of the other picture from at least one existing syntax element.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus comprising:
an encoder for encoding an image block of a picture corresponding to at least one view of multi-view video content by obtaining motion information for the image block based upon disparity information for a first region of a plurality of regions of an other picture, the other picture corresponding to at least one other view of the multi-view video content, and each region corresponding to less than an entirety of the other picture, wherein each region includes multiple image blocks, each region having been determined based on a similarity among disparity vectors of the multiple image blocks of the region, and wherein the disparity information for the first region includes a regional disparity vector determined from the disparity vectors of the multiple image blocks of the first region.

2. The apparatus of claim 1, wherein said encoder obtains a plurality of regional disparity vectors, each regional disparity vector corresponding to a respective one of the plurality of regions.

3. The apparatus of claim 1, wherein the regional disparity vector is based on a mean of the disparity vectors of the multiple image blocks of the first region.

4. The apparatus of claim 3, wherein the regional disparity vector is transmitted using a high level syntax element.

5. The apparatus of claim 4, wherein the high level syntax element is comprised in at least one of a slice header, a sequence parameter set, a picture parameter set, a view parameter set, a network abstraction layer unit header, and a supplemental enhancement information message.

6. The apparatus of claim 1, wherein a list index, a regional disparity index, and a reference index are transmitted for each image block corresponding to a multi-view content selected as a motion skip macroblock.

7. A method comprising:
encoding an image block of a picture corresponding to at least one view of multi-view video content by obtaining motion information for the image block based upon disparity information for a first region of a plurality of regions of an other picture, the other picture corresponding to at least one other view of the multi-view video content, and each region corresponding to less than an entirety of the other picture, wherein each region includes multiple image blocks, each region having been determined based on a similarity among disparity vectors of the multiple image blocks of the region, and wherein the disparity information for the first region includes a regional disparity vector determined from the disparity vectors of the multiple image blocks of the first region.

8. The method of claim 7, wherein said encoding further comprises obtaining a plurality of regional disparity vectors.

9. The method of claim 7, wherein the regional disparity vector is based on a mean of the disparity vectors of the multiple image blocks of the first region.

10. The method of claim 9, further comprising:
transmitting the regional disparity vector using a high level syntax element.

11. The method of claim 10, wherein the high level syntax element is comprised in at least one of a slice header, a sequence parameter set, a picture parameter set, a view parameter set, a network abstraction layer unit header, and a supplemental enhancement information message.

12. The method of claim 7, further comprising:
transmitting a list index, a regional disparity index, and a reference index for each image block corresponding to a multi-view content selected as a motion skip macroblock.

13. An apparatus comprising:
a decoder for decoding an image block of a picture corresponding to at least one view of multi-view video content by obtaining motion information for the image block based upon disparity information for a first region of a Plurality or regions of an other picture, the other picture corresponding to at least one other view of the'multi-view video content, and each region corresponding to less than an entirety of the other picture, wherein each region includes multiple image blocks, each region having been determined based on a similarity among disparity vectors of the multiple image blocks of the region, and wherein the disparity information for the first region includes a regional disparity vector determined from the disparity vectors of the multiple image blocks of the first region.

14. The apparatus of claim 13, wherein the regional disparity vector is explicitly indicated in a high level syntax element, and said decoder determines the regional disparity vector from the high level syntax element.

15. The apparatus of claim 14, wherein the high level syntax element is comprised in at least one of a slice header, a sequence parameter set, a picture parameter set, a view parameter set, a network abstraction layer unit header, and a supplemental enhancement information message.

16. The apparatus of claim 13, wherein said decoder determines a plurality of regional disparity vectors, each regional disparity vector corresponding to a respective one of the plurality of regions.

17. The apparatus of claim 13, wherein said decoder receives a list index, a regional disparity index, and a reference index for each image block corresponding to a multi-view content selected as a motion skip macroblock.

18. The apparatus of claim 17, wherein said decoder obtains the disparity information for the first region using the list index, the regional disparity index, and the reference index.

19. The apparatus of claim 18, wherein said decoder identifies an image block in the other picture corresponding to the image block of the picture using the regional disparity vector for the first region, the identified image block being located within the first region.

20. A method comprising:
  decoding an image block of a picture corresponding to at least one view of multi-view video content by obtaining motion information for the image block based upon disparity information for a first region of a plurality of regions of an other picture, the other picture corresponding to at least one other view of the multi-view video content, and each region corresponding to less than an entirety of the other picture, wherein each region includes multiple image blocks, each region having been determined based on a similarity among disparity vectors of the multiple image blocks of the region, and wherein the disparity information for the first region includes a regional disparity vector determined from the disparity vectors of the multiple image blocks of the first region.

21. The method of claim 20, wherein the regional disparity vector is explicitly indicated in a high level syntax element, and said decoding comprises determining the regional disparity vector from the high level syntax element.

22. The method of claim 21, wherein the high level syntax element is comprised in at least one of a slice header, a sequence parameter set, a picture parameter set, a view parameter set, a network abstraction layer unit header, and a supplemental enhancement information message.

23. The method of claim 20, wherein said decoding comprises determining a plurality of regional disparity vectors, each regional disparity vector corresponding to a respective one of the plurality of regions.

24. The method of claim 20, wherein said decoding comprises receiving a list index, a regional disparity index, and a reference index for each image block corresponding to a multi-view content selected as a motion skip macroblock.

25. The method of claim 24, wherein said decoding comprises obtaining the disparity information for the first region using the list index, the regional disparity index, and the reference index.

26. The method of claim 25, wherein said decoding comprises identifying an image block in the other picture corresponding to the image block of the picture using the regional disparity vector for the first region, the identified image block being located within the first region.

27. A non-transitory storage media having computer executable code stored thereon for performing a method, the method comprising:
  encoding an image block of a picture corresponding to at least one view of multi-view video content by obtaining motion information for the image block based upon disparity information for a first region of a plurality of regions of an other picture, the other picture corresponding to at least one other view of the multi-view video content, and each region corresponding to less than an entirety of the other picture, wherein each region includes multiple image blocks, each region having been determined based on a similarity among disparity vectors of the multiple image blocks of the region, and wherein the disparity information for the first region includes a regional disparity vector determined from the disparity vectors of the multiple image blocks of the first region.

28. The non-transitory storage media of claim 27, wherein said encoding further comprises obtaining a plurality of regional disparity vectors.

29. The non-transitory storage media of claim 27, wherein the regional disparity vector is based on a mean of the disparity vectors of the multiple image blocks of the first region.

30. The non-transitory storage media of claim 29, wherein the method further comprises:
  transmitting the regional disparity vector using a high level syntax element.

31. The non-transitory storage media of claim 30, wherein the high level syntax element is comprised in at least one of a slice header, a sequence parameter set, a picture parameter set, a view parameter set, a network abstraction layer unit header, and a supplemental enhancement information message.

32. The non-transitory storage media of claim 27, wherein the method further comprises:
  transmitting a list index, a regional disparity index, and a reference index for each image block corresponding to a multi-view content selected as a motion skip macroblock.

33. A non-transitory storage media having computer executable code stored thereon for performing a method, the method comprising:
  decoding an image block of a picture corresponding to at least one view of multi-view video content by obtaining motion information for the image block based upon disparity information for a first region of a plurality of regions of an other picture, the other picture corresponding to at least one other view of the multi-view video content, and each region corresponding to less than an entirety of the other picture, wherein each region includes multiple image blocks, each region having been determined based on a similarity among disparity vectors of the multiple image blocks of the region, and wherein the disparity information for the first region includes a regional disparity vector determined from the disparity vectors of the multiple image blocks of the first region.

34. The non-transitory storage media of claim 33, wherein the regional disparity vector is explicitly indicated in a high level syntax element, and said decoding comprises determining the regional disparity vector from the high level syntax element.

35. The non-transitory storage media of claim 34, wherein the high level syntax element is comprised in at least one of a slice header, a sequence parameter set, a picture parameter set, a view parameter set, a network abstraction layer unit header, and a supplemental enhancement information message.

36. The non-transitory storage media of claim 33, wherein said decoding comprises determining a plurality of regional disparity vectors, each regional disparity vector corresponding to a respective one of the plurality of regions.

37. The non-transitory storage media of claim 33, wherein said decoding comprises receiving a list index, a regional disparity index, and a reference index for each image block corresponding to a multi-view content selected as a motion skip macroblock.

38. The non-transitory storage media of claim 37, wherein said decoding comprises obtaining the disparity information for the first region using the list index, the regional disparity index, and the reference index.

39. The non-transitory storage media of claim 38, wherein said decoding comprises identifying an image block in the other picture corresponding to the image block of the picture using the regional disparity vector for the first region, the identified image block being located within the first region.

* * * * *